United States Patent [19]

Munk

[11] Patent Number: 4,875,904
[45] Date of Patent: Oct. 24, 1989

[54] COFFEE BEAN ROASTER

[75] Inventor: Harald Munk, Stockelsdorf, Fed. Rep. of Germany

[73] Assignee: NOVOPACK Maschinenbau GmbH, Fed. Rep. of Germany

[21] Appl. No.: 187,314

[22] Filed: Apr. 28, 1988

[30] Foreign Application Priority Data

Apr. 28, 1987 [DE] Fed. Rep. of Germany ....... 3714594

[51] Int. Cl.$^4$ ............................................. F26B 11/12
[52] U.S. Cl. ............................................. 34/67; 34/62; 34/241; 34/181
[58] Field of Search .................. 34/179, 181, 241, 62, 34/66

[56] References Cited

U.S. PATENT DOCUMENTS 1,991,190  2/1935  Backer et al. ......................... 34/79

FOREIGN PATENT DOCUMENTS 2531390  12/1981  Fed. Rep. of Germany .
3217055  11/1983  Fed. Rep. of Germany .
WO84/01271  4/1984  PCT Int'l Appl. .

Primary Examiner—Henry A. Bennet
Assistant Examiner—John Sollecito
Attorney, Agent, or Firm—Thomas M. Freiburger

[57] ABSTRACT

A coffee-bean roaster for small quantities of coffee, which has a cylindrical roasting chamber (11) and in which only one fan (35) is provided for roasting and for cooling, is described. The coffee beans are roasted in the roasting chamber as a result of the blowing-in of heated air via at least two blowing-in conduits (12) which are arranged off-center and of which the blowing-out direction is set at an angle of between 0° and 30° relative to the roasting-chamber axis in the tangential direction. After the roasting operation has ended, the roasted coffee beans are transferred, via an openable bottom (19) of the roasting chamber, into a collecting container (5), the sieve-like bottom of which is connected to the supply-air conduit (28), so that the roasted coffee beans are cooled by the sucked in supply air of the roasting chamber (FIG. 3).

22 Claims, 5 Drawing Sheets

COFFEE BEAN ROASTER

BACKGROUND OF THE INVENTION

The invention relates to a coffee-bean roaster for small quantities, with a vertically directed cylindrical roasting chamber, a fan for supplying air to the roasting chamber for the swirling of coffee beans introduced into the roasting chamber, a suction port for sucking up supply air, an exhaust-air port which is preceded by a separator device for coffee-bean residues transported together with the exhaust air, and a heating device in the supply-air conduit.

In order to develop the flavorings and aromatics in green coffee beans, it is necessary to roast these before they can be brewed with hot water for coffeemaking. The quality of the finished coffee is essentially determined by the chosen length of time between roasting and the making of the coffee drink. It is therefore desirable to carry out the roasting operation only immediately before the coffee is delivered to the final consumer.

Automatic roasters intended for small quantities of, for example, 250–1,000 g have already become known for this purpose. It is thus possible, on the one hand, also to use these automatic roasting machines in the retail trade and, on the other hand, to be able to offer the customer different coffee mixtures on request.

German Patent Specification No. 2,531,390 makes known a coffee-bean roaster, in which there is a roasting chamber enclosed by a housing and having a perforated bottom, through which heated roasting air is blown into the roasting chamber from below by a fan, so that the beans present in the roasting chamber are swirled round by rising along one wall and falling down again on the opposite wall. This cylindrical swirling of the green coffee beans to be roasted ensures that all the coffee beans are roasted uniformly and from all sides.

In order to cool the roasted coffee beans, in this apparatus there is an additional fan which swirls the coffee beans with ambient air and thereby cools them. The applicance involves a very high outlay in terms of construction and is therefore uneconomic for relatively small roasting quantities.

WO No. 84/01271 makes known another coffee-bean roaster having, underneath a supply-air plenum, a cylindrical roasting chamber in which a toroidal movement is imparted to the introduced coffee beans by means of an air jet blowing into the roasting chamber from a blowing-in pipe arranged coaxially relative to the roasting chamber. The air stream for roasting the coffee beans is generated by a first fan. A second fan serves for cooling the roasted coffee beans. This apparatus likewise involves a very high outlay in terms of construction, with the result that the roasting of relatively small quantities usually entails substantially higher costs than factory roasting.

Finally, a coffee-bean roaster for small quantities has become known from German Offenlegunsschrift No. 3,217,055, and in this the coffee beans are swirled up through a sieve from below and, after roasting, as a result of the opening of a flap pass out of the roasting chamber onto a grid for cooling. They are thus cooled by the supply air to the roasting chamber, with the heating switched off. This apparatus makes it possible to roast only very small quantities of coffee for domestic use. Because of the simple design, there is no guarantee of uniformity of the roasting process and roasting result.

Starting from WO No. 84,01271, the object on which the invention is based is to provide a simplified coffeebean roaster which requires only a single fan for roasting and cooling the coffee beans and is of simple constructional design, but in which the roasting process gives a uniform roasting result, and which can be controlled in a flexible way.

This object is achieved by means of the invention indicated in the claims. Advantageous developments of the invention are given in subclaims.

The coffee-bean roaster according to the invention is, in principle, designed in such a way that the supply air is introduced into the roasting chamber from above via several inlet conduits and is eliminated again coaxially upwards.

For this purpose, the coffee-bean roaster has a vertically directed cylindrical roasting chamber which is designed so that the hot air blown into the roasting chamber from above is supplied off-center via at least two blowing-in conduits which are directed towards the bottom of the roasting chamber and of which the blowing-out direction relative to the roasting-chamber axis is set at a respective equidirectional oblique blowing-out angle of between 0° up to and 30° in the tangential direction of the roasting chamber.

The coffee beans are introduced into the roasting chamber above the latter through a coffee-bean inlet which can be shut off. On the underside of the roasting chamber there is an openable bottom, through which the roasted coffee beans can fall out of the roasting chamber into a collecting container which is arranged underneath it and the air-permeable bottom of which at the same time forms the suction port for sucking up the supply air.

This arrangement according to the invention avoids the need for an additional fan for the cooling operation. The already roasted coffee beans can thus be cooled directly by the suction air of the supply-air conduit. It is also possible, even while one batch of coffee is being cooled, to roast the next batch.

The coffee-bean roaster according to the invention is of simple design. Only simple control and switching devices, actuable manually or by means of an automatic programmer, for shutting off the coffee-bean inlet, for opening the bottom of the roasting chamber and for controlling the air supply, temperature and roasting or cooling time are required. The apparatus according to the invention can be designed as a table-top unit, but at the same time it is possible to roast a batch of coffee of a quantity of approximately 500–600 g within a very short time.

The invention is explained in more detail below with reference to an exemplary embodiment.

DESCRIPTION OF PREFERRED EMBODIMENT

Figure 1:
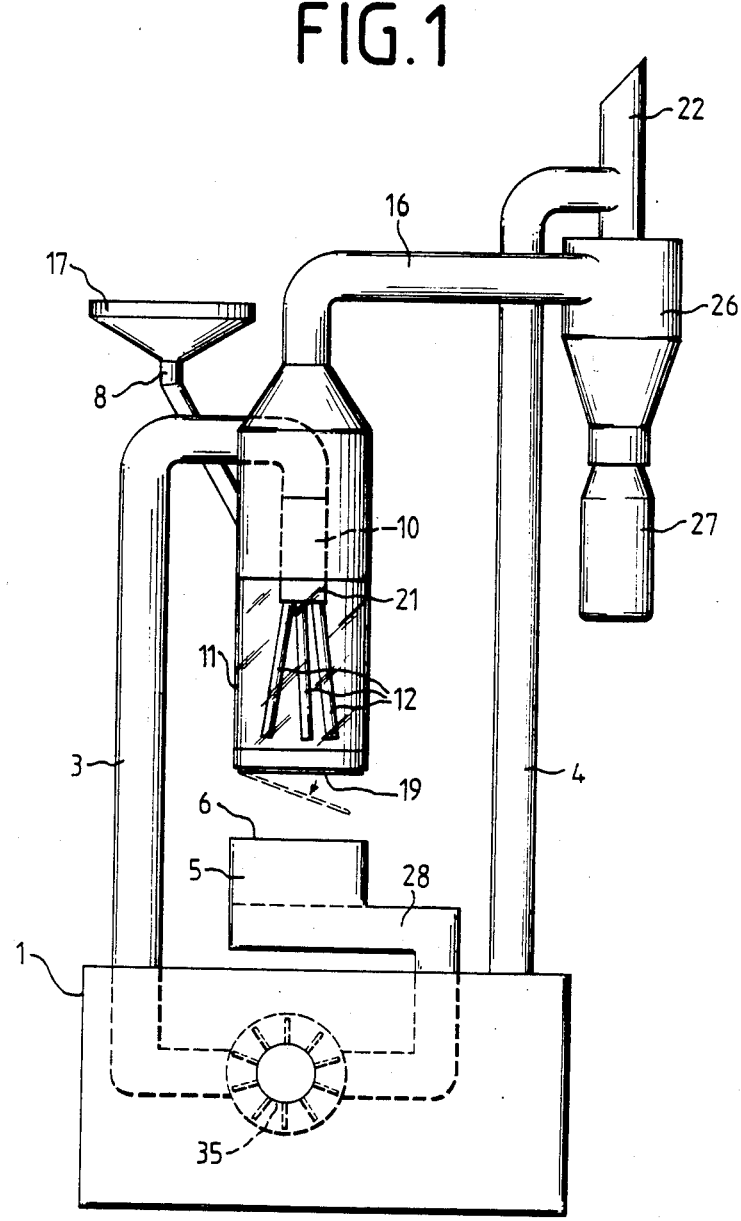
FIG. 1 shows a basic representation of the invention.

FIG. 1 shows a diagrammatic view of the apparatus according to the invention. The supply air is guided via the suction port 6 and the supply-air conduit 28 to the fan 35 which is preferably designed as an annular compressor. From there, the supply air passes via the tubular column 3 to the roasting chamber 11. The heating unit 10 is located in the supply-air conduit at the upper end of the roasting chamber 11. Immediately after the heating unit 10 there is a distributor 21 distributing the heated supply air to blowing-in conduits 12, the open end of which is directed towards the bottom 19 of the roasting chamber. The introduced coffee beans are swirled round in the roasting chamber 11. The exhaust air is conveyed coaxially round the heating unit and round the end of the supply-air conduit, via the conduit 16, to the cyclone 26 in which coffee-bean residues, such as husks, roasting fragments, dust, etc., are removed from the exhaust air. The residues at the same time fall into the collecting vessel 27. The purified exhaust air leaves the cyclone via the central exhaust-air port 22.

Underneath the bottom 19 of the roasting chamber 11 is the collecting container 5, into which the ready-roasted beans can fall after the bottom 19 has been opened. While the beans are being roasted, the supply air is sucked up via the sieve-like bottom of the container 5 and the conduit 28. After the beans have fallen into the container 5, the supply air is sucked in directly through the beans, so that these are thereby cooled. There is therefore no need for a special cooling fan.

If, while a batch of coffee beans is being cooled, a new batch is already being roasted, the energy consumption of the apparatus can be reduced considerably. It is also possible to switch off the heating 10 at least temporarily during the cooling of a batch of coffee beans.

In the apparatus according to the invention, the same cyclone separator is used for roasting and for cooling, so that the residues of the coffee beans can be collected in the same collecting vessel in both operating modes, without there being an emission into the environment. There is therefore no need for additional filter or separator devices for cooling.

Figure 2:
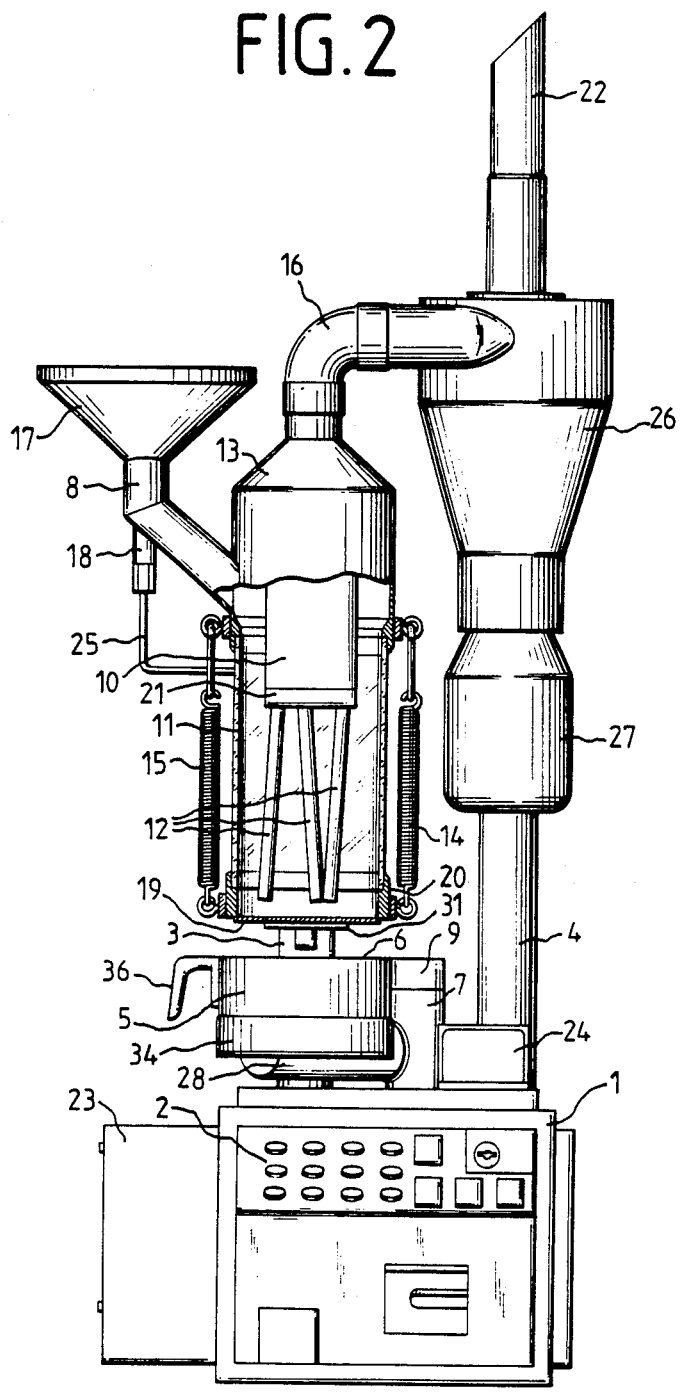
FIG. 2 shows a front view of a constructed arrangement according to the invention.

FIG. 2 shows a front view of the apparatus according to the invention. The essential parts of the apparatus are constructed on a basic body 1 which, on the front side, has a control panel 2 for settings, switches and indicator elements. Arranged on the side of the basic body 1 is a housing extension 23 which serves for accommodating control units and which can easily be removed from the basic body 1 for servicing. Inside the basic body there is, among other things, the fan. Further operating elements 24 can be provided on the top side of the basic body.

On the rear side of the basic body 1 there are two vertically directed columns 3 and 4, to which the essential parts of the apparatus are fastened. The column 3 at the same time forms the supply-air conduit which is connected to the exit side of the fan in the basic body 1.

The supply-air conduit 3, starting from the basic body, leads upwards and then, via an extension piece directed horizontally forwards, radially into the roasting-chamber mounting 13. Adjoining the end of the supply-air conduit is the heating unit or region 10, in which the supply air is heated up to the roasting temperature. The heating 10 is located essentially centrally within the roasting-chamber mounting 13. Arranged immediately after the heating unit is a distributor 21, in which the heated air is allocated to at least two blowing-in conduits 12. In a preferred embodiment of the invention, there are three blowing-in conduits 12.

Figure 6:
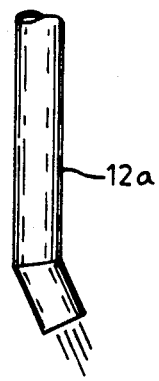
FIG. 6 is a schematic view in elevation, indicating a modified construction of a blowing-in conduit.
Figure 7:
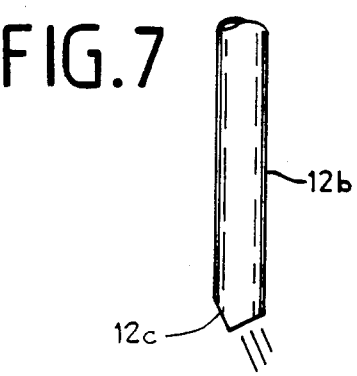
FIG. 7 is another schematic view in elevation, showing a further modified construction of a blowing-in conduit.

The blowing-in conduits 12 are directed downwards into the actual roasting chamber 11 towards the bottom of the latter. Their orifice is at a distance of preferably 0.5 to 3 cm from the bottom of the roasting chamber 11. The inlet conduits are arranged off-center, the blowing-out direction of the individual blowing-out conduits relative to the roasting-chamber axis being set at a respective equidirectional oblique blowing-out angle of between 0° and 30°, preferably approximately 15°, in the tangential direction of the roasting chamber. In addition to the angular setting in the tangential direction, the blowing-out tubes can also be set outward or inward at a small oblique angle of at most 20° in the radial direction. The blowing-in conduits can be aligned at the said angle directly, starting from the distributor, but they can also first be guided down vertically and only in the lower region be bent at the desired angle, as indicated schematically in FIG. 6, showing a single conduit 12a. Instead of or in addition to the angular setting of the ends of the blowing-out tubes conduits 12, the blowing-out plane of the blowing-in conduits can also be chamfered at an angle, in such a way that an assumed perpendicular to the blowing-out plane is at an angle to the longitudinal axis of the blowing-out tube which amounts at most to 30°. This is indicated in FIG. 7, showing a single conduit 12b with an exit end chamfer 12c.

The arrangement of the blowing-out tubes which is illustrated guarantees that the coffee beans introduced into the roasting chamber 11 not only are held in suspension by the hot air blown in, but at the same time are swirled about, and in their entirety they constantly change their place inside the roasting chamber. During the total roasting time, the individual beans run round a vertical axis several times, so that there are no blowing-in gaps and a high uniformity of the roasting result is achieved.

The green coffee beans are introduced into the roasting chamber via the filling funnel 17. This opens into an inlet connection 8, through which the coffee beans fall into the roasting chamber 11. In order to shut off the orifice, there is a valve which can be shut off by means of a valve-actuating member 18. The valve is preferably actuated via a Bowden pull guided through a cable 25. Preferably the valve is designed as a piston-shaped valve closed at the top, which is provided with lateral orifices and fits closely in the inflow connection 8 and which, for opening, is lifted so far into the funnel-shaped inlet that the coffee beans can run into the inlet connection through the lateral orifices.

Since the heating and consequently the supply-air conduit are located centrally within the roasting-chamber mounting 13, the exhaust air conveyed away from the roasting chamber 11 can be eliminated coaxially round the heating 13 and upwards through the exhaust-air conduit 16 to the cyclone 26. In the cyclone 26, the roasting residues are removed from the exhaust air and then fall into the collecting container 27, whilst the purified exhaust air is emitted into the ambient air via the exhaust-air port 22. The cyclone is supported by the column 4 via struts 39 and 33.

The cylindrical roasting chamber 11 preferably consists of a glass cylinder, so that the roasting operation can be made visible. The glass body is connected via springs 14 and 15 to the roasting-chamber mounting 13 by means of an annular holder 20 which supports the lower edge of the glass body. The bottom 19 of the roasting chamber comprises a plate which presses against the annular holder 20 in the closed state.

Figure 3:
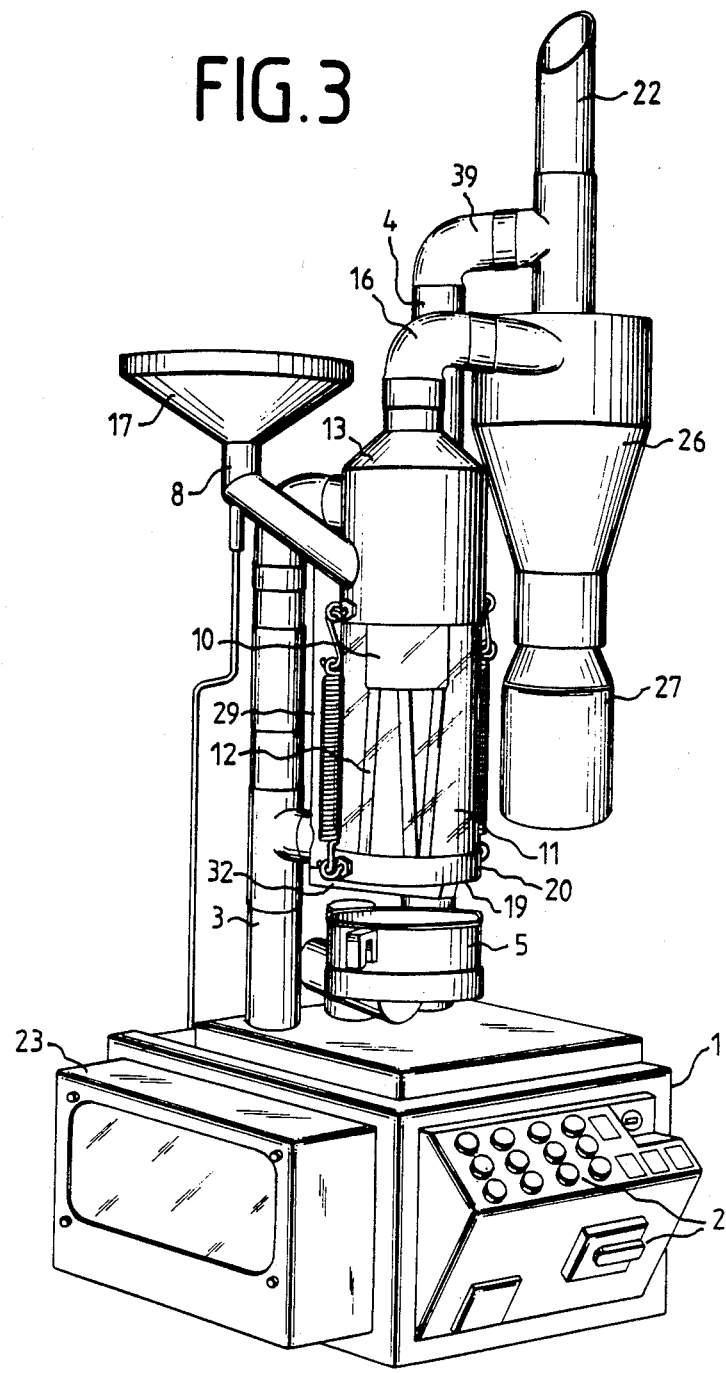
FIG. 3 shows a perspective view of a constructed arrangement.

FIG. 3 shows a general perspective view of the apparatus according to the invention for a clearer illustration.

Figure 4:
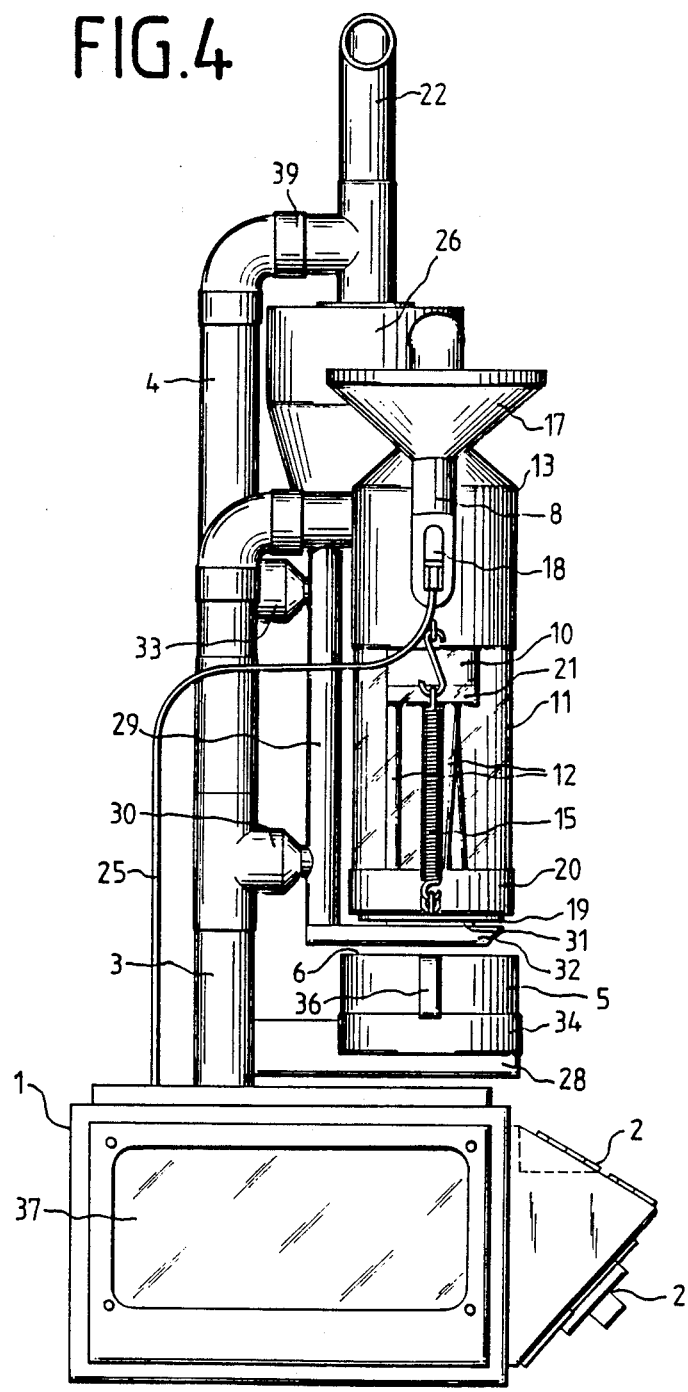
FIG. 4 shows a side view of an arrangement according to FIGS. 2 and 3.

FIG. 4 shows a side view of an apparatus according to the invention. In the basic body 1 there is a lateral window 37, so that for servicing in particular, the position of controllers or switching devices arranged inside the housing can be ascertained quickly.

Arranged on the rear side of the basic body 1 are the columns 3 and 4 which extend vertically upwards. The column 3 serves at the same time as a supply-air conduit for supplying fan air to the roasting chamber. The column 4 and its upper strut 39 extendinig horizontally serve essentially for supporting the cyclone 26.

There is a holder 29 which is connected to the column 3 via a strut 30. At the lower end of the holder 29 there is a pressure plate 32 carrying, on its top side, a ball bearing 31, to which the bottom 19 is fastened. When the pressure plate 32 is pressed against the annular holder 20, it is thus possible to guarantee that the bottom 19 seals off the bottom of the roasting chamber 11 perfectly under all circumstances without offset problems. The pressure plate 32 is actuated by means of a lever device (not shown) preferably actuated by a Bowden pull which is actuated by a servo-motor inside the basic body 1.

When the bottom 19 is opened, the coffee beans roasted in the roasting chamber 11 are transferred into the collecting container 5 arranged underneath the roasting chamber. The collecting container 5 is designed as a pot-shaped container with a sieve-like bottom which can be removed from the holder 34 by means of a handle 36. The holder 34 is located at the front open end of the supply-air conduit 28 which forms the inlet side of the fan arranged in the basic body 1.

Figure 5:
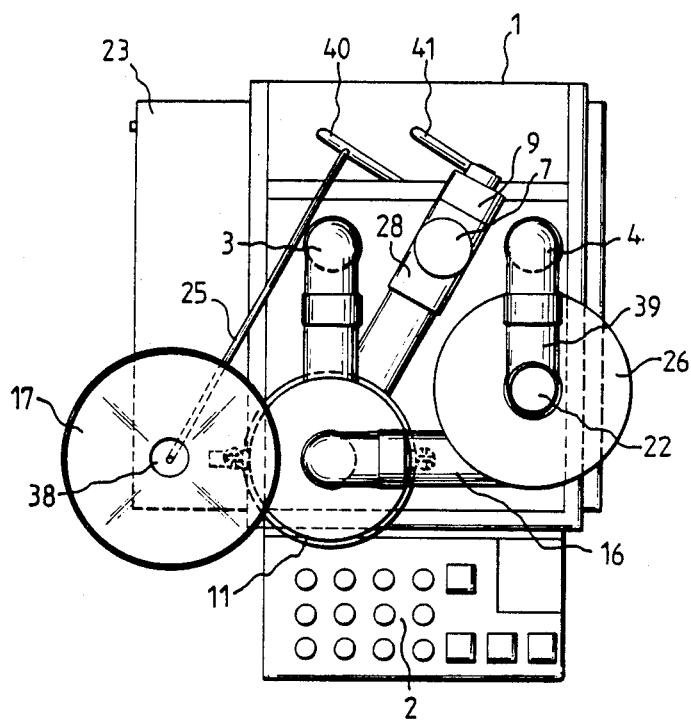
FIG. 5 shows a plan view of an arrangement according to the invention.

FIG. 5 shows a plan view of the arrangement according to the invention. The two columns 3 and 4, between which a further third column 7 is arranged, can be seen clearly. The third column 7 merely carries the supply-air conduit 28 and, in the transition between the column 7 and the supply-air conduit 28, has a valve 9 which serves for controlling the volumetric flow of the supply air. The valve 9 is controllable via an actuating member 41 which is preferably actuated by a servo-motor inside the basic body 1. For the pre-setting of a maximum quantity of supply air, the valve is coupled to a presetting valve which can be designed especially as a chamfered bushing tube, in which the actual setting valve is arranged.

The apparatus is controlled essentially via the temperature of the roasting air and the length of time of roasting or cooling. As soon as the roasting time has ended, the supply-air valve is shut off via the actuating member 41, in order to terminate the swirling of the coffee beans in the roasting chamber. The bottom 19 of the roasting chamber is then opened, and the coffee beans fall into the collecting container 5. As soon as the bottom of the roasting chamber is closed again, the supply-air valve can also be opened again, so that the cooling operation now begins. After the cooling phase has ended, the collecting container 5 can be removed from the holder 29. In order to introduce the coffee beans via the filling funnel 17, the supply-air valve is likewise closed, in order to prevent exhaust air from escaping through the filling funnel 17.

All the control operations can be carried out automatically according to a temperature and time setting made once on the control panel 2. There is therefore no need for any special monitoring of the apparatus. It should be pointed out that, even while one batch of coffee beans is being cooled, a new batch can be roasted.

I claim:

1. A coffee bean roaster for small quantities, with a vertically directed cylindrical roasting chamber (11), a fan (35) for supplying air to the roasting chamber (11) for the swirling of coffee beans introduced into the roasting chamber, a suction port (6) for sucking up supply air and a supply-air conduit (3) connected to the suction port, an exhaust-air port (22) which is preceded by a separator device (26) for coffee bean residues transported together with the exhaust air, and a heating device (10) in the supply-air conduit, wherein the hot air blown into the roasting chamber (11) from above is supplied off-center via at least two blowing-in conduits (12) which are directed towards the bottom (19) of the roasting chamber and of which the blowing-out direction relative to the roasting-chamber axis is set at a respective equidirectional oblique angle of up to 30° in the tangential directon of the roasting chamber, whereby continuous circulation of the coffee beans occurs during roasting.

2. A coffee-bean roaster as claimed in claim 1, wherein the blowing-in conduits (12), starting from an air distributor (21) arranged at the upper end of the roasting chamber, are directed towards the bottom of the roasting chamber at the blowing-out angle.

3. A coffee-bean roaster as claimed in claim 1, wherein the blowing-in conduits (12), starting from an air distributor (21) arranged at the upper end of the roasting chamber, extend essentially parallel to the roasting-chamber axis, and wherein the lower end of the blowing-out conduits is bent in the blowing-out direction.

4. A coffee-bean roaster as claimed in claim 2 or 3, wherein the lower end of the blowing-in conduits (12) is chamfered in such a way that the assumed perpendicular to the outlet plane is set at an oblique angle of up to 30° relative to the axis of the blowing-in conduits.

5. A coffee-bean roaster as claimed in one of claims 1 to 3, wherein the blowing-in conduits (12) are each angled in the radial direction at an oblique angle of up to 20° relative to the roasting-chamber axis.

6. A coffee-bean roaster as claimed in claim 2 or 3, wherein the air distributor (21) is connected to the end of the supply-air conduit, wherein the heating device (10) is located immediately in front of the air distributor (21) in the supply-air conduit, and wherein the exhaust air is eliminated from the roasting chamber coaxially round the supply-air conduit and round the heating device.

7. A coffee-bean roaster with a vertically directed cylindrical roasting chamber (11), a fan (35) for supplying air to the roasting chamber for the swirling of coffee beans introduced into the roasting chamber, a suction port (6) for sucking up supply air, an exhaust-air port (22) which is preceded by a separator device (26) for coffee-bean residues transported together with the exhaust air, and a heating device (10) in the supply-air conduit, wherein the supply air is supplied to the roasting chamber (11) from above via a central supply-air conduit, wherein the exhaust air is eliminated from the roasting chamber upwards coaxially round the supply-air conduit and round the heating (10), wherein a coffee-bean inlet (17) which can be shut off is arranged above the roasting chamber, and from which the coffee beans pass through the exhaust-air conduit into the roasting chamber, wherein the roasting chamber (11) has an openable bottom (19), through which the roasted coffee beans can fall out of the roasting chamber, and wherein there is, underneath the roasting chamber, a collecting container (5) for the coffee beans, the air-permeable bottom of which forms the suction port for sucking up the supply air.

8. A coffee-bean roaster as claimed in claim 7, wherein the bottom (19) is pressed against the roasting chamber (11) via a pressure plate (32).

9. A coffee-bean roaster as claimed in claim 7, wherein a releasable mounting (34) for receiving the removable collecting container (5) is arranged on the suction port (6) of the supply-air conduit (28).

10. A coffee-bean roaster as claimed in claim 7, wherein the separator device (26) is a cyclone separator, on the underside of which is arranged a releasable collecting vessel (27).

11. A coffee-bean roaster as claimed in claim 7, wherein the supply-air conduit (28) has an inlet valve (9) for controlling the throughflow volume of the supply air.

12. A coffee-bean roaster as claimed in claim 11, wherein a basic-setting valve which limits the maximum throughflow volume of the supply air is provided in the supply-air conduit.

13. A coffee-bean roaster as claimed in claim 7, wherein the coffee-bean inlet has a blockable filling valve.

14. A coffee-bean roaster as claimed in claim 13, wherein the filling valve is designed in the form of a hollow piston which is provided with at least one lateral orifice and is inserted with a close fit in an inflow connection (8) of the coffee-bean inlet and which, for opening, can be lifted so far out of the inlet connection (8) into the funnel-shaped filling orifice (17) that coffee beans introduced into the latter pass, after the valve has opened, through the lateral orifice into the inflow connection (8) and from there into the roasting chamber (11) via the exhaust-air conduit.

15. A coffee-bean roaster as claimed in claim 7, of the preceding claims, wherein a basic body (1) for receiving the fan (35) and a central switching and control device is provided, wherein on the basic body (1) there is a first essentially vertically arranged column (3) which carries the roasting chamber (11) at its upper end bent approximately 90°, wherein on the basic body (1) there is a second column (4) which is arranged essentially vertically and parallel to the first column (3) and which carries the separtor device (26) at its upper end, and wherein the suction port (6) is arranged at the end of a horizontally arranged conduit (28) which is connected to the basic body (1) via a vertically arranged column (7).

16. A coffee-bean roaster as claimed in claim 15, wherein the horizontally arranged conduit (28) is connected to a third vertically arranged column (7).

17. A coffee-bean roaster as claimed in claim 15, wherein the horizontally arranged conduit (28) is connected to the second vertically arranged column (4).

18. A coffee-bean roaster as claimed in claim 15, wherein the first column (3) is designed as a supply-air conduit connected to the fan (35) and leading to the roasting chamber, and wherein the horizontally arranged conduit (28) forms an inlet conduit connected to the entrance of the fan (35).

19. A coffee-bean roaster as claimed in claim 18 or 11, wherein the valve is provided in the transition between the horizontally arranged conduit (28) and the vertically arranged column.

20. A coffee-bean roaster as claimed in claim 19, wherein the inlet valve is actuable as a result of the pivoting of the horizontally arranged conduit (28), the inlet valve being closed when the suction port is located underneath the roasting chamber.

21. A coffee-bean roaster as claimed in claim 11, 13 or 15, wherein the filling valve, the inlet valve and the bottom (19) of the roasting chamber (11) are actuable by means of the central switching and control device.

22. A coffee-bean roaster as claimed in claim 15, wherein the exhaust-air outlet (22) of the roasting chamber is connected tangentially to the cyclone separator (26) via conduit (39) extending essentially horizontally.

* * * * *